(12) United States Patent
Arcelaschi et al.

(10) Patent No.: US 10,578,229 B2
(45) Date of Patent: Mar. 3, 2020

(54) FLEXIBLE STEM BELLOW ASSEMBLY

(71) Applicant: Cameron International Corporation, Houston, TX (US)

(72) Inventors: Augusto Arcelaschi, Colico (IT); Edy Gaburri, Piateda (IT)

(73) Assignee: Cameron International Corporation, Houston, TX (US)

(*) Notice: Subject to any disclaimer, the term of this patent is extended or adjusted under 35 U.S.C. 154(b) by 0 days.

(21) Appl. No.: 16/237,651

(22) Filed: Dec. 31, 2018

(65) Prior Publication Data
US 2019/0137003 A1 May 9, 2019

Related U.S. Application Data

(63) Continuation of application No. 15/249,340, filed on Aug. 26, 2016, now Pat. No. 10,167,977.

(30) Foreign Application Priority Data

Aug. 17, 2016 (EP) ..................... 16275116

(51) Int. Cl.
| F16K 41/06 | (2006.01) |
| F16K 5/06 | (2006.01) |
| F16K 41/10 | (2006.01) |

(52) U.S. Cl.
CPC .............. *F16K 41/106* (2013.01); *F16K 5/06* (2013.01); *F16K 5/0647* (2013.01); *F16K 5/0694* (2013.01); *F16K 41/10* (2013.01)

(58) Field of Classification Search
CPC ..... F16K 41/106; F16K 5/0647; F16K 5/0694
USPC ............................................... 251/615.01, 77
See application file for complete search history.

(56) References Cited

U.S. PATENT DOCUMENTS

| 2,105,864 A | 1/1938 | Saunders |
| 3,096,966 A | 7/1963 | McFarland, Jr. |
| 3,104,554 A | 9/1963 | Mueller et al. |
| 3,216,264 A | 11/1965 | Lloyd |
| 3,462,120 A | 8/1969 | Priese |
| 4,428,561 A | 1/1984 | Thompson |
| 4,515,344 A | 5/1985 | Gemignani |
| 4,522,369 A | 6/1985 | Gemignani |
| 5,088,687 A | 2/1992 | Stender |
| 7,401,760 B2 | 7/2008 | Kanzaka et al. |

(Continued)

FOREIGN PATENT DOCUMENTS

| DE | 2821329 A1 | 11/1979 |
| DE | 8524413 U1 | 10/1985 |
| WO | 2008145891 A1 | 12/2008 |

OTHER PUBLICATIONS

PCT International Search Report & Written Opinion for PCT Application No. PCT/US2017/047436 dated Sep. 21, 2017; 9 Pages.

(Continued)

*Primary Examiner* — Kevin F Murphy
*Assistant Examiner* — Kelsey E Cary
(74) *Attorney, Agent, or Firm* — Fletcher Yoder, P.C.

(57) ABSTRACT

A bellows assembly is configured to mount between a movable valve structure and a stationary valve structure of a valve assembly. The bellows assembly comprises a bellows and a spacer. The bellows is configured to compress until a gap is closed relative to the spacer. The bellows assembly is configured to bear a load through the bellows before the gap is closed, and the bellows assembly is configured to bear the load through the bellows and the spacer after the gap is closed.

12 Claims, 5 Drawing Sheets

(56) References Cited

U.S. PATENT DOCUMENTS

| | | |
|---|---|---|
| 2006/0266962 A1 | 11/2006 | Kanzaka et al. |
| 2006/0284135 A1 | 12/2006 | Hayashi et al. |
| 2010/0200791 A1 | 8/2010 | Yung et al. |
| 2013/0020799 A1 | 1/2013 | Silveira et al. |
| 2013/0240771 A1 | 9/2013 | Nemenoff |
| 2015/0252635 A1 | 9/2015 | Hartley et al. |
| 2015/0337968 A1 | 11/2015 | Strand et al. |
| 2015/0369377 A1 | 12/2015 | Noble et al. |

OTHER PUBLICATIONS

Extended EP Search Report for EP Application No. 16275116.8 dated Feb. 10, 2017; 11 Pages.

FLEXIBLE STEM BELLOW ASSEMBLY

CROSS REFERENCE TO RELATED APPLICATIONS

This application is a continuation of U.S. patent application Ser. No. 15/249,340, entitled "FLEXIBLE STEM BELLOW ASSEMBLY", filed Aug. 26, 2016, which claims priority to and benefit of EP Patent Application No. EP16275116.8, entitled "FLEXIBLE STEM BELLOW ASSEMBLY", filed Aug. 17, 2016, which is herein incorporated by reference in its entirety.

BACKGROUND

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

The present disclosure relates to valve assemblies, in particular to valve assemblies with a stem. The valve assembly of the present disclosure finds particular use in the control of fluids produced from subterranean wells, but could be used to control the flow of other fluids.

A stem of the valve is rotated about an axis. The stem is coupled to an obturator (e.g., a ball) with a bore between a fully open position and a fully closed position to control fluid flow. The fluid pressure in a conduit can impact the performance and wear of valves. Unfortunately, at higher pressures, an increased amount of friction between a stem, a stem bellow, and a gland may result in a large amount of torque to actuate the valve. Thus, there is a need for an improved stem bellow assembly, capable of operating at high pressures, but without the associated high actuation torque.

BRIEF DESCRIPTION OF THE DRAWINGS

Various features, aspects, and advantages of the present disclosure will become better understood when the following detailed description is read with reference to the accompanying figures in which like characters represent like parts throughout the figures, wherein.

DETAILED DESCRIPTION OF SPECIFIC EMBODIMENTS

One or more specific embodiments of the present disclosure will be described below. These described embodiments are only exemplary of the present disclosure. Additionally, in an effort to provide a concise description of these exemplary embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Moreover, the use of "top," "bottom," "above," "below," and variations of these terms is made for convenience, but does not require any particular orientation of the components.

Fluids are produced from subterranean wells at high pressures (e.g., up to 10,000 psi or more). Fluids, such as gas and oil, together with fluids introduced into the well during drilling and completion operations, such as water and muds, can be produced from the well at pressures up to 10,000 psi and higher. The high pressures increase the friction between the stem, the stem bellow, and the gland, increasing the torque to actuate the valve. Accordingly, the control of fluids produced from a well represents a significant task for a valve assembly, particularly at high pressures. By utilizing a flexible stem bellow with parallel ribs, a spacer ring that contacts the gland at high pressures, and a low-friction thrust washer, high operating pressures without correspondingly high actuation torques may be achieved.

Figure 1:
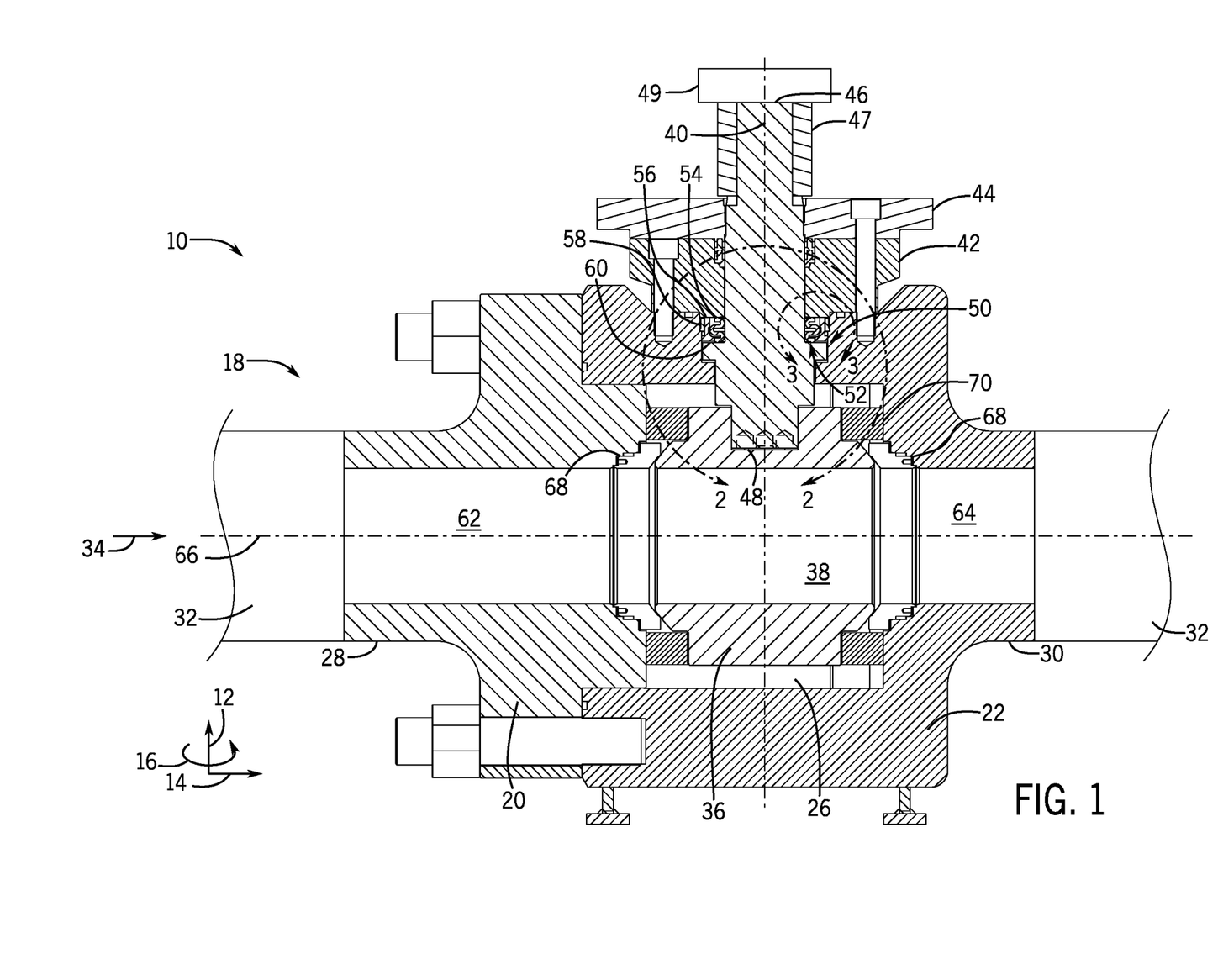
FIG. 1 is a section, side view of one embodiment of a ball valve with a flexible stem bellow assembly having parallel ribs and a low-friction spacer.

FIG. 1 is a section, side view of one embodiment of a valve 10 (e.g., a ball valve) with a flexible stem bellow assembly having parallel ribs and a low-friction spacer. Though the disclosed embodiments are ball valves, it should be understood that the disclosed techniques may be applied to valves other than ball valves. For example, the disclosed techniques may be applied to butterfly valves, disc valves, clapper valves, check valves, choke valves, diaphragm valves, gate valves, globe valves, needle valves, pinch valves, piston valves, plug valves, poppet valves, spool valves, thermal expansion valves, pressure reducing valves, sampling valves, and the like. For clarity, a coordinate system is shown that includes an axial direction 12, a radial direction 14, and a circumferential direction 16. The ball valve 10 includes a housing 18, which may include multiple parts (e.g., first housing component 20, second housing component 22, third housing component 24). Though the housing 18 of the ball valve 10 illustrated in FIG. 1 includes three components, it should be understood that in other embodiments, the housing 18 may include any number of components. For example, the housing 18 may include 1, 2, 3, 4, 5, 6, 7, 8, 9, 10, or more components. The housing has a central cavity 26. In the illustrated embodiment, the housing 18 has a first flange 28 (e.g., annular flange) and a second flange 30 (e.g., annular flange) disposed opposite the first flange 28. The first and second flanges 28, 30 may be coupled to sections of pipe, elbows, or other fluid flow components, or one or more mineral extraction components 32 having a corresponding flange. Fluid flows through the valve 10, as indicated by arrow 34. Fluid may flow through the valve 10 from the first flange 28 to the second flange 30, or from the second flange 30 to the first flange 28. Some embodiments of the ball valve 10 may be configured for one-directional fluid flow (e.g., from the first flange 28 to the second flange 30). Other embodiments of the ball valve 10 may be configured for bi-directional fluid flow (e.g., from the first flange 28 to the second flange 30, and from the second flange 30 to the first flange 28). A ball 36 may be disposed within the housing 18. The ball 36 may have a bore 38 through it such that as the ball 36 is rotated about a vertical axis 40, fluid flow through the valve 10 is restricted or enabled.

An annular gland 42 and an annular adapter plate 44 may be coupled to the housing 18. A stem 46 extends through the adapter plate 44 and the gland 42 and interfaces with the ball 36 (e.g., via springs 48 and fasteners) such that the stem 46 may be rotated to adjust the position of the ball 36, thus enabling or restricting fluid flow through the valve 10. The springs 48 may bias the stem upward in the axial direction 12 toward the gland 42. A key 47 may be disposed about the stem, adjacent to the adapter plate 44.

A stem bellow assembly 50 may be disposed at an interface between the stem 46 and the gland 42. For example, in the illustrated embodiment, the stem bellow assembly 50 rests on an annular lip 52 of the stem 46, which faces the gland 42. The stem bellow assembly 50 includes an annular flexible stem bellow 54 with parallel ribs, an annular spacer ring 56, an annular anti-blowout ring 58, and a low friction thrust washer 60. The spacer ring 56 may be made of a low friction material, or rest on the annular thrust washer 60 made of a low friction material. In other embodiments, the stem bellow assembly 50 may include additional components, or various combinations of the parts shown (e.g., a flexible stem bellow 54 and a spacer ring 56, but no anti-blowout ring 58. As will be shown and described in more detail with regard to FIGS. 3 and 4, the stem bellow 54 may have a series of parallel (e.g., horizontal) ribs joined by curves, creating S-shaped bends. The spacer ring 56 may be disposed about the stem bellow 54 and rest on a low-friction thrust washer 60. The thrust washer may be made of a material having a lower coefficient of friction than the stem bellow 54. The spacer ring 56 may have a height such that below a threshold pressure, the spacer ring 56 does not touch the gland 42, but at pressures above the threshold pressure, the spacer ring 56 touches the gland 42 and bears some of the load acting on the stem bellow 54. The stem bellow assembly 50 forms a seal between the gland 42 and the stem 46, which may fully or partially restrict fluid flow between the stem 46 and the gland 42. The springs 48 disposed between the stem 46 and the ball 36 energize the stem bellow assembly 50 at low pressure. In the illustrated embodiment, the springs 48 bias the stem 46 axially upward.

The valve housing 18 has a first bore 62 and a second bore 64 (e.g., fluid flow passages), which extend through the housing 18 in the radial 14 direction, intersecting the ball bore 38, and allowing fluid to flow through the valve 10. The first and second bores 62, 64 are substantially aligned with one another along a horizontal axis 66. Though the horizontal and vertical axes 66, 40 are used, it should be understood that this is merely for convenience and that any orientation may be possible between first and second crosswise (e.g., perpendicular) axes. The housing 18 components 20, 22, 24 may be made of carbon steel, stainless steel, titanium, nickel based alloys, or any other suitable material. The housing 18 components 20, 22, 24 may be cast, forged, machined, molded, 3D printed, a combination thereof, or made by some other technique. The housing 18 components 20, 22, 24 may or may not be made of the same material and may or may not be made by the same manufacturing process.

Disposed between the housing 18 and the ball 20, on either side of the ball 36, is an annular seat 68. In the illustrated embodiment, the seats 68 on either side of the ball 36 have identical shapes. However, in other embodiments, the seats 68 on either side of the ball 36 may have slightly different shapes. The seats 68 on either side of the ball 36 may be held in place by annular support plates 70, which may couple to the housing 18.

Figure 2:
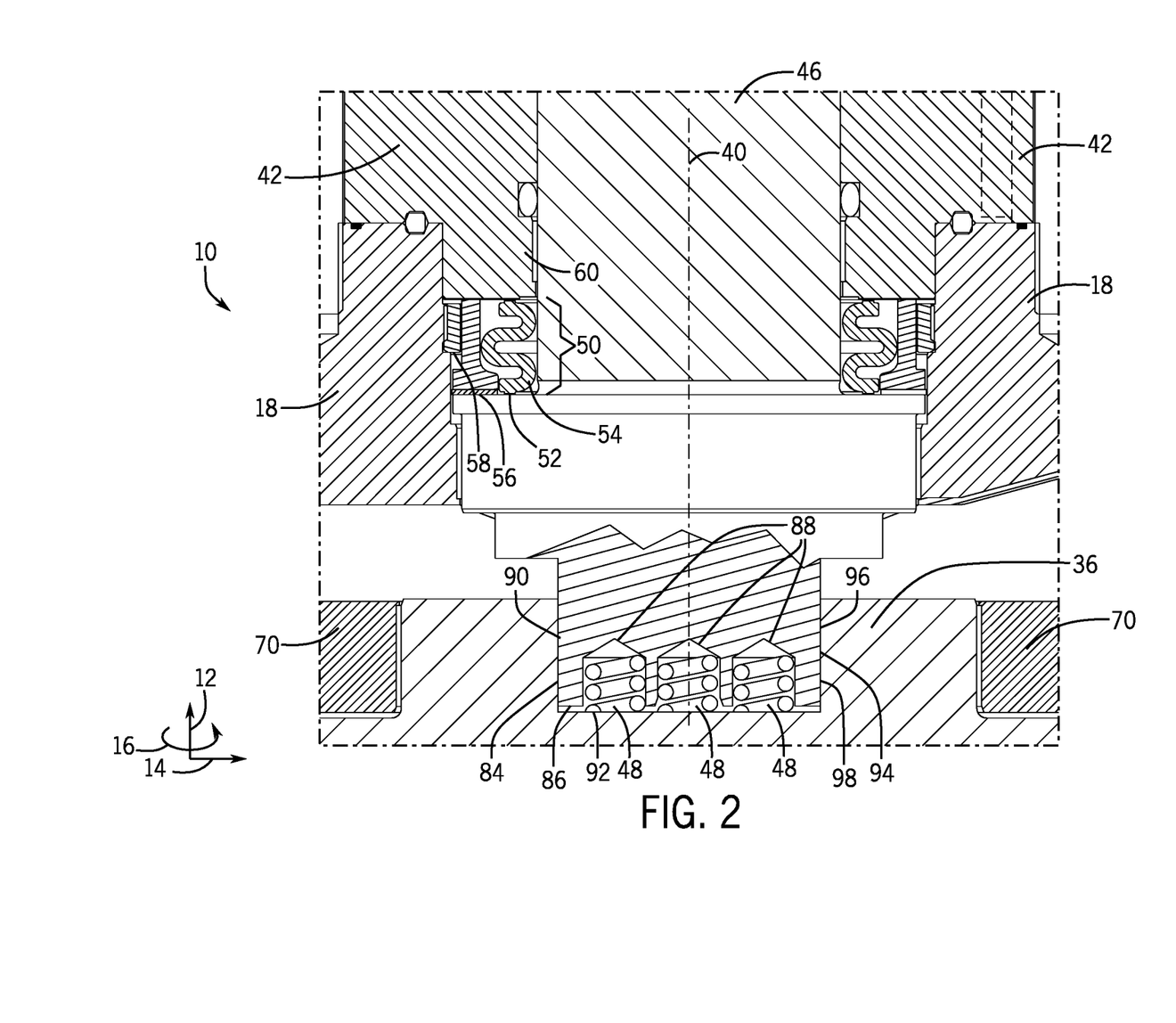
FIG. 2 is a side, section, detail view of an embodiment of an interface between a ball, a stem, a housing, and a gland inside of line 2-2 of FIG. 1.

FIG. 2 is a side, section, detail view of an embodiment of an interface between the ball 36, the stem 46, the housing 18, and the gland 42 inside of line 2-2 of FIG. 1. As illustrated, stem 46 couples to the ball 36 via the springs 48 and fasteners (e.g., screws). The stem bellow assembly 50 (e.g., the stem bellow 54, the spacer ring 56, the anti-blowout ring 58, and the thrust washer 60) rest on an annular lip 52 of the stem 46. The stem bellow 54 is disposed about the stem 46, and the spacer ring 56 is disposed about the stem 46. However, in other embodiments, the stem bellow 54 may be disposed about the spacer ring 56. The spacer ring 56 may rest on the low friction thrust washer 60 or be may be made of a low friction material. The stem bellow assembly 50 may or may not include an anti-blowout ring 58 disposed about the spacer ring 56. The housing 18 may be disposed about the stem bellow assembly 50. The gland 42 may be disposed about the stem 46 and axially 12 above the flexible stem bellow assembly 50. The springs 48 may be disposed between the stem 46 and the ball 36. The springs 48 may be used to bias the stem 46 toward the gland 42 (e.g., bias the stem bellow assembly 50 toward the gland 42) in order to energize the stem bellow assembly 50 such that seals are formed between the flexible stem bellow 54, the stem 46, and the gland 42 at reduced working pressures.

Figure 3:
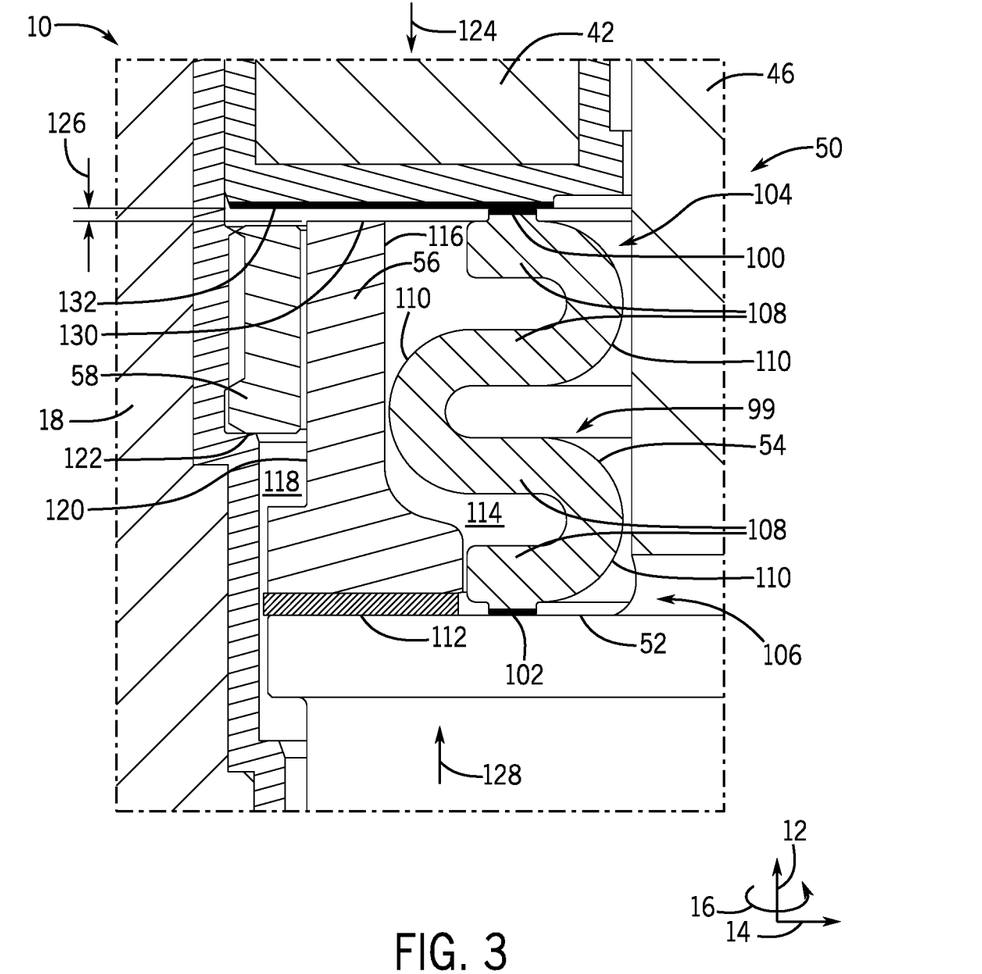
FIG. 3 is a side, section, detail view of one embodiment of the stem bellow assembly taken within line 3-3 of FIG. 1 when a working pressure of the ball valve 10 is below a threshold pressure.

FIG. 3 is a side, section, detail view of one embodiment of the stem bellow assembly 50 taken within line 3-3 of FIG. 1 when the working pressure of the ball valve 10 is below the threshold pressure. As shown, the flexible stem bellow 54 has first and second annular protrusions 100, 102 at first and second axial ends 104, 106 of the stem bellow. At the first end 104, the first annular protrusion 100 forms a dynamic metal-to-metal seal with the gland 42. At the second end, the second annular protrusion 102 forms a dynamic metal-to-metal seal with the lip 52 of the stem 46. As illustrated, the flexible stem bellow 54 includes a number of parallel annular ribs 108 extending in the radial direction 14, joined by 180 degree bends 110 (e.g., two inward facing bends and one outward facing bend). Though the illustrated embodiment of the stem bellow 54 includes 4 parallel ribs 108 joined by 3 bends 110, it should be understood that the stem bellow 54 may include 2, 3, 4, 5, 6, 7, 8, 9, 10, 12, 14, 16, 18, 20, or more parallel ribs 108. In the illustrated embodiment, the stem bellow 54 has a uniform thickness 111, however other embodiments of the stem bellow 54 may have a non-uniform thickness. That is, the thickness of the ribs 108 may be different from the thickness of the bends 110. Additionally, the thickness of the stem bellow 54 may vary across one of the ribs 108 or bends 110. Put another way, the stem bellow 54 may be generally annular in shape, having a curving wall that alternatingly increases and decreases in diameter to define a wave pattern, which is configured to compress and expand in the axial direction 12. The stem bellow 54 may be compressible, having one or more turns or curved portions, which are configured to contract or expand in axial direction 12.

The shape of the stem bellow 54 allows the stem bellow 54 to deflect such that its length in the axial-direction 12 may extend or contract. In some embodiments, the stem bellow 54 may contact the spacer ring 56 and the spacer ring 56 may offer support to the stem bellow 54 to keep the stem bellow 54 from moving radially 14 outward and collapsing. The flexible stem bellow 54 may be made of carbon steel, stainless steel, titanium, nickel based alloys, or any other suitable material. The material of the flexible seat may be selected such that the flexible seat expands and/or contracts a given amount relative to the expansion and/or contraction of the spacer ring 56. For example, in operation the expansion and/or contraction may be 1.1, 1.5, 2, 2.5, 3, 3.5, 4, 4.5, 5, 6, 7, 8, 9, or 10 times that of the spacer ring 56. For example, the spacer ring 56 may provide no expansion or contraction, while the stem bellow 54 may provide less than 1, 2, 3, 4, 5, 6, 7, 8, 9, 10, 15, or 20% of the expansion and/or contraction of the stem bellow assembly 50. The spacer ring 56 may or may not be made of the same material as the stem bellow 54.

The annular thrust washer 60 rests on top (e.g., in the axial direction 12) of the lip 52 of the stem 46. The spacer ring 56 rests on top (e.g., in the axial direction 12) of the thrust washer 60. The spacer ring and/or the thrust washer 60 may be made of a low-friction material, such as polyether ether ketone (PEEK), Polytetrafluoroethylene (PTFE), low friction metals, such as brass, coated metals, coated non-metals, plastics and elastomers, etc., such that the frictional forces at the interfaces between the lip 52 of the stem 46, the thrust washer 60, the spacer ring 56, and the gland 42 are low when the stem 46 is rotated about the vertical axis 40 to actuate the valve 10. For example, the thrust washer 60 and/or the spacer ring 56 may have a coefficient of friction $\mu_{tw}$ of 0.01, 0.02, 0.03, 0.04, 0.05, 0.06, 0.07, 0.08, 0.09, 0.1, 0.13, 0.15, 0.17, or any other value less than the coefficient of friction of the stem bellow 54. The coefficient friction of the thrust washer 60 and/or the spacer ring 56 $\mu_{tw}$ may also be defined as a percentage of the coefficient friction of the stem bellow 54 $\mu_{sb}$. For example, $\mu_{tw}$ may be 5%, 10%, 15%, 20%, 25%, 30%, 40%, 50%, 60%, 70%, 80%, or 90% of $\mu_{sb}$.

As shown, the spacer ring 56 includes a recess 114 on a radially interior side 116 of the spacer ring 56. Portions of the stem bellow 54 (e.g., some of all of the radially exterior bends 110) may extend into the recess 114. The recess 114 may have a curvature that is close to or matches the curvature of the bends 110 of the stem bellow 54. The spacer ring 56 may also include a recess 118 on a radially exterior side 120 of the spacer ring 56. If the stem bellow assembly 50 includes an anti-blowout ring 58, the anti-blowout ring 58 may extend in a radial direction 14 into the recess 118. In some embodiments, the housing 18 may include a lip 122 (e.g., annular surface) upon which the anti-blowout ring 58 rests. The anti-blowout ring 58 extends into the recess 188 on the radially exterior side 120 of the spacer ring 56. Because the anti-blowout ring 58 has a smaller diameter than the lip 52 of the stem 46, if the adapter plate 44 and the gland 42 come loose when the valve is pressurized, the stem 46 will not be ejected from the valve 10.

As previously discussed, FIG. 3 illustrates the stem bellow assembly 50 when the working pressure in the valve 10 is below the threshold pressure. In the configuration shown in FIG. 3 there is not fluid in the valve 10. The springs 48 energizes the stem bellow assembly 50 by biasing the stem 46 axially upward, as indicated by arrow 124. As shown, the stem bellow 54 contacts the gland 42, compressing the stem bellow 54 such that a first dynamic metal-to-metal seal is formed at the interface of the first protrusion 100 and the gland 42, and a second dynamic metal-to-metal seal is formed at the interface of the second protrusion 102 and the lip 52 of the stem 46. Accordingly, fluid flow from the radially exterior side of the stem bellow 54 to the radially interior side of the stem bellow 54 is inhibited. If the working pressure of the valve 10 is below the threshold value, a gap 126 exists between the spacer ring 56 and the gland 42. As the working pressure of the valve 10 increases, approaching the threshold pressure, the stem 46 is pushed axially upward, as indicated by arrow 128, compressing the stem bellow 54 in the axial direction 12 and closing the gap 126. Below the threshold pressure, the stem bellow 54 bears the entirety of the load of the stem 46 being pushed axially upward (arrow 128) due to increased pressure in the valve 10. As the working pressure in the valve 10 reaches the threshold pressure, a top surface 130 of the spacer ring 56 makes contact with a bottom surface 132 of the gland 42 and begins to bear part of the load of the stem 46 being pushed axially upward (arrow 128) due to increased pressure in the valve 10.

Figure 4:
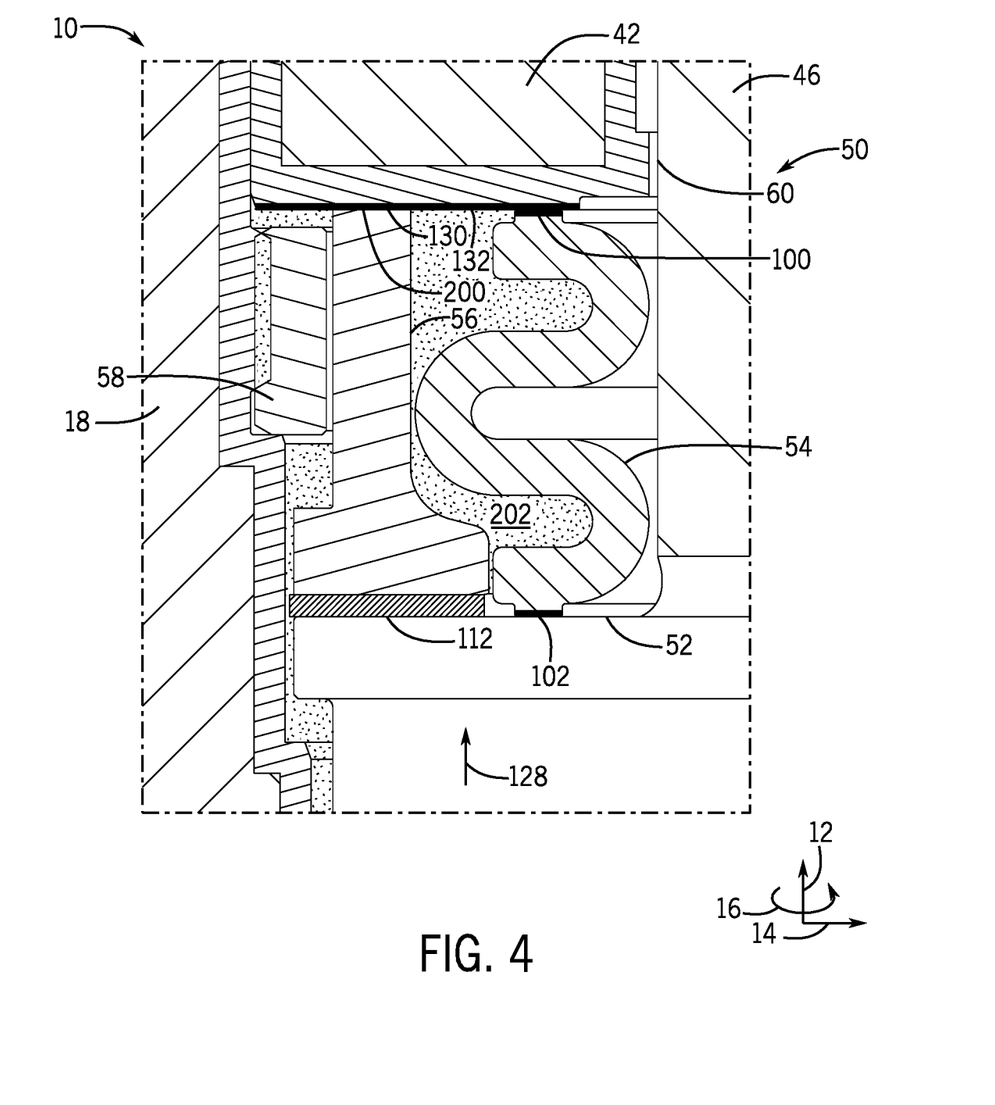
FIG. 4 is a side, section, detail view of one embodiment of the stem bellow assembly taken within line 3-3 of FIG. 1 when the working pressure of the ball valve is above the threshold pressure.

FIG. 4 is a side, section, detail view of one embodiment of the stem bellow assembly 50 taken within line 3-3 of FIG. 1 when the working pressure of the ball valve 10 is above the threshold pressure. As the working pressure in the valve 10 reaches the threshold pressure, the stem 46 is pushed axially upward (arrow 128), compressing the stem bellow 54. As the stem bellow 54 compresses, the top surface 130 of the spacer ring 56 makes contact with the bottom surface 132 of the gland 42, forming an annular contact area 200. When the spacer ring 56 makes contact with the gland 42, the spacer ring 56 bears at least some of the load of the stem 46 being pushed in the axial direction 12, along arrow 128. Because the spacer ring 56 is generally stationary and rigid relative to the flexible stem bellow 54, once the spacer ring 56 makes contact with the gland 42, the stem's 46 movement in the axial direction 12 ceases or substantially ceases as the operating pressure increases. Accordingly, once the spacer ring 56 makes contact with the gland 42, the stem bellow 54 stops deflecting (e.g., contracting in the axial direction 12) and reaches a steady state in which the load on the stem bellow 54 remains substantially constant. As the load of the stem 46 on the flexible stem bellow 54 and spacer ring 56 increases due to the operating pressure being above the threshold pressure, the stem bellow 54 bears a substantially constant load while the load borne by the spacer ring 56 increases.

The spacer ring 56, the thrust washer 60, or both, may be made of a low-friction material such that the frictional forces between the lip 52 of the stem 46, the thrust washer 60, and/or the spacer ring 56, or between the gland 42 and the spacer ring 56, are lower than those between the flexible stem bellow 54 and the gland 42, or between the flexible stem bellow 54 and the lip 52 of the stem 46 when the stem 46 is rotated to actuate the valve 10. For example, the stem bellow 54 may have a coefficient of friction $\mu_{sb}$ of approximately 0.15 while the thrust washer 60 or spacer ring 56 may have a coefficient of friction $\mu_{tw}$ of 0.05. Thus, the stem bellow assembly 50 having a low friction thrust washer 60 and/or spacer ring 56 allows high operating pressures without corresponding high torque values to actuate the valve 10. For example, at an operating pressure of approximately 15,000 psi, using a stem bellow assembly 50 having a flexible stem bellow 54 with a low friction thrust washer 60 and/or spacer ring 56 may reduce the "break to open" (BTO) torque of the valve 10, compared to a valve 10 having a typical stem bellow, by more than 60%.

As illustrated in FIG. 4, at higher operating pressures, the valve may fill with fluid 202. As discussed above, the dynamic metal-to-metal seals formed between the first protrusion 100 and the gland 42, as well as between the lip 52 of the stem 46 and the second protrusion 102 may inhibit fluid flow from the radially 14 exterior side of the stem bellow 54 to the radially 14 interior side of the stem bellow 54.

Figure 5:
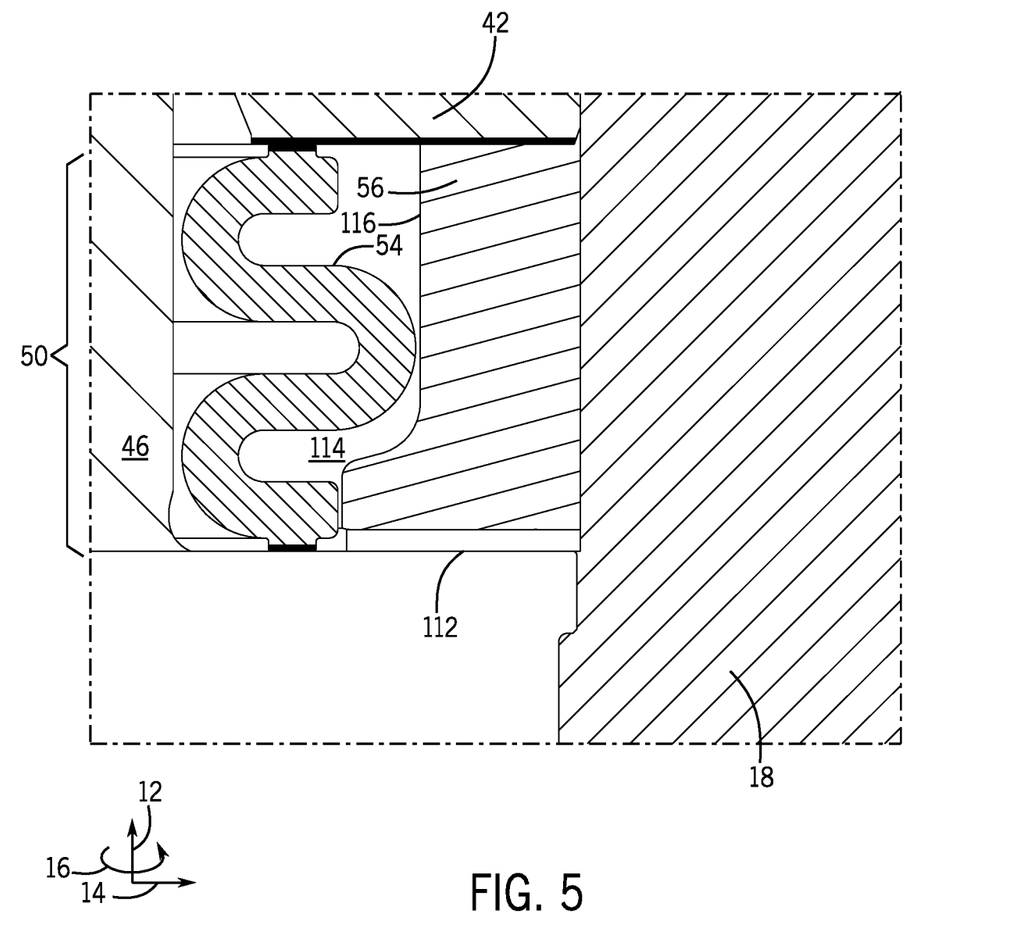
FIG. 5 is a side, section, detail view of one embodiment of the stem bellow assembly without an anti-blowout ring.

FIG. 5 is a side, section, detail view of one embodiment of the stem bellow assembly 50 without the optional anti-blowout ring 58. As illustrated, the embodiment of the spacer ring 56 shown lacks the recess 118 on the radially exterior side (see FIG. 3), but does have the recess 114 on the radially interior surface 116. Accordingly, in the illustrated embodiment, the spacer ring 56 directly abuts the housing 18 in the radial direction 14. However, though the stem bellow assembly 50 lacks an anti-blowout ring 58, the operation of the stem bellow 54 and the spacer ring 56 are not substantially changed. That is, when the working pressure of the valve 10 is below a threshold value, the stem bellow 54 makes contact with the gland 42, but the spacer ring 56 does not. As the working pressure in the valve 10 approaches and exceeds the threshold pressure, the stem bellow 54 compresses in the axial direction 12 until the spacer ring 56 makes contact with the gland 42. As the working pressure increases beyond the threshold pressure, so too does the axial force from the stem 46 compressing the stem bellow 54. Once the spacer ring 56 makes contact with the gland 42, as the working pressure increases, the load borne by the stem bellow 54 is substantially constant, while the load borne by the spacer ring 56 increases. As discussed above, the spacer ring 56, the thrust washer 60, or both, may be made of a material with a lower coefficient of friction that the stem bellow such that the torque to rotate the stem 46 and operate the valve 10 is reduced.

Presently disclosed embodiments include valves having stem bellow assemblies disposed between the stem and the gland that include a flexible stem bellow with parallel ribs and a spacer ring that rests on a low-friction thrust washer. Though the illustrated embodiments are ball valves, the disclosed techniques may be applied to other types of valves. In alternate embodiments, the spacer ring may be made of a low-friction material and the thrust washer may be omitted. When the working pressure in the valve is below a threshold pressure the flexible stem bellow contacts the gland, but the spacer ring does not. When the working pressure is above the threshold pressure, the spacer ring contacts the gland and bears some of the load created by the working pressure. The low friction thrust washer reduced the torque to operate the valve at high working pressures.

While the claimed subject matter may be susceptible to various modifications and alternative forms, specific embodiments have been shown by way of example in the drawings and have been described in detail herein. However, it should be understood that the disclosure is not intended to be limited to the particular forms disclosed. Rather, the disclosure is to cover all modifications, equivalents, and alternatives falling within the spirit and scope of the disclosure as defined by the following appended claims.

The invention claimed is:

1. A system comprising:
a bellows assembly configured to mount between a movable valve structure and a stationary valve structure of a valve assembly, wherein the bellows assembly comprises:
a bellows having opposite first and second sealing surfaces configured to slide along first and second opposing sealing surfaces on the stationary valve structure and the movable valve structure, respectively, during movement of the movable valve structure relative to the stationary valve structure.

2. The system of claim 1, wherein the bellows assembly comprises a spacer, wherein the bellows is configured to compress until a gap is closed relative to the spacer, the bellows assembly is configured to bear a load through the bellows before the gap is closed, and the bellows assembly is configured to bear the load through the bellows and the spacer after the gap is closed.

3. The system of claim 2, wherein the bellows is coaxial with the bellows.

4. The system of claim 2, wherein the spacer is disposed about the bellows.

5. The system of claim 2, wherein the spacer has opposite first and second surfaces configured to removably contact first and second opposing surfaces on the stationary valve structure and the movable valve structure, respectively.

6. The system of claim 1, wherein the movable valve structure comprises a valve stem coupled to a valve.

7. The system of claim 6, wherein the valve comprises a ball valve.

8. The system of claim 7, wherein the movement comprises rotation of the valve stem and the ball valve.

9. The system of claim 8, comprising the movable valve structure and the stationary valve structure, wherein the stationary valve structure comprises a valve housing.

10. A system, comprising:
a valve housing having a fluid chamber along a fluid passage;
a ball valve disposed in the fluid chamber;
a valve stem coupled to the ball valve; and
a bellows disposed about the valve stem, wherein the bellows is configured to fluidly seal the fluid chamber between the valve housing and the valve stem, and the bellows has opposite first and second sealing surfaces configured to slide along first and second opposing sealing surfaces on the valve housing and the valve stem, respectively, during movement of the valve stem and ball valve relative to the valve housing.

11. The system of claim 10, wherein the valve housing comprises a gland disposed about the valve stem.

12. The system of claim 10, comprising a spacer disposed about the valve stem, wherein the bellows is configured to compress until a gap is closed relative to the spacer, the system is configured to bear a load through the bellows before the gap is closed, and the system is configured to bear the load through the bellows and the spacer after the gap is closed.

* * * * *